(12) United States Patent
Spiker et al.

(10) Patent No.: US 10,389,647 B2
(45) Date of Patent: Aug. 20, 2019

(54) CONTROLLER COORDINATION SYSTEM

(71) Applicant: The Boeing Company, Chicago, IL (US)

(72) Inventors: Carrie V. Spiker, Yorba Linda, CA (US); Claudiu B. Danilov, Cypress, CA (US)

(73) Assignee: The Boeing Company, Chicago, IL (US)

( * ) Notice: Subject to any disclaimer, the term of this patent is extended or adjusted under 35 U.S.C. 154(b) by 13 days.

(21) Appl. No.: 15/491,494

(22) Filed: Apr. 19, 2017

(65) Prior Publication Data
US 2018/0309690 A1    Oct. 25, 2018

(51) Int. Cl.
*H04L 12/801* (2013.01)
*H04W 28/04* (2009.01)
*H04L 1/16* (2006.01)
*H04L 29/06* (2006.01)

(52) U.S. Cl.
CPC ............. *H04L 47/34* (2013.01); *H04W 28/04* (2013.01); *H04L 1/1635* (2013.01); *H04L 63/104* (2013.01)

(58) Field of Classification Search
CPC ..... H04L 47/34; H04L 63/104; H04L 1/1635; H04W 28/04
See application file for complete search history.

(56) References Cited

U.S. PATENT DOCUMENTS

| | | | | |
|---|---|---|---|---|
| 2006/0229080 A1* | 10/2006 | Khan | ................... | H04W 48/18 455/450 |
| 2010/0205323 A1* | 8/2010 | Barsness | ............. | G06F 16/2455 709/248 |
| 2014/0304401 A1* | 10/2014 | Jagadish | ............. | H04L 41/0853 709/224 |
| 2015/0188767 A1* | 7/2015 | Li | ........................ | H04L 41/0823 370/254 |
| 2015/0195162 A1* | 7/2015 | Gandham | ............... | H04L 41/04 709/206 |

FOREIGN PATENT DOCUMENTS

WO    WO2015023537 A2    2/2015
WO    WO2016174597 A1    3/2016

OTHER PUBLICATIONS

Moser et al., "Extended Virtual Synchrony," Proceedings of the 14th IEEE International Conference on Distributed Computing Systems, Jun. 1994, 10 pages.
European Patent Office Extended Search Report, dated Sep. 3, 2018, regarding Application No. 18155482.5, 10 pages.
Coulouris et al: "Distributed Systems: Concepts and Design," Distributed Systems: Concepts and Design 5th Edition, May 7, 2011, Addison-Wesley, US, XP055319910, ISBN:978-0-13-214301-1; 32 pages.

* cited by examiner

*Primary Examiner* — Walli Z Butt
(74) *Attorney, Agent, or Firm* — Yee & Associates, P.C.

(57) ABSTRACT

A method and apparatus for a software defined wireless network. The software defined wireless network comprises a plurality of wireless devices and a plurality of controllers. The plurality of wireless devices is configured to be separated into functioning partitions in the software defined wireless network. The plurality of controllers is located on the plurality of wireless devices. Controllers in the plurality of controllers in a functioning partition in the functioning partitions are configured to perform operations in the functioning partition with data synchronized using message sequencing information in the functioning partition.

19 Claims, 8 Drawing Sheets

CONTROLLER COORDINATION SYSTEM

BACKGROUND INFORMATION

1. Field

The present disclosure relates generally to an improved computer system, and in particular, to a method and apparatus for managing controllers in a partitionable network by using a controller coordination system.

2. Background

Software defined networking (SDN) is an approach to computer networking that allows network administrators to programmatically initialize, control, change, and manage network behavior dynamically via open interfaces and abstraction of lower-level functionality. Software defined networking encompasses several types of network technology that make a network as agile and flexible as the virtualized server and storage infrastructure of a modern data center.

In a network using software defined networking, traffic engineering is performed to reroute packets to meet or improve one or more metrics. These metrics may include, for example, bandwidth, packets per second, a latency, a maximum frame rate, a maximum throughput, connections per second, maximum concurrent connections, and other metrics relating to network performance.

With this type of networking, a central controller maintains a view of devices on a network. The central controller directs network switches to forward traffic, as needed. With wired networks, multiple controllers are typically present for redundancy or load balancing.

Software defined networking works well on wired networks in which stability is present. This type of networking is also valuable for wireless networks. Wireless networks, such as wireless tactical ground networks, however, may have limited bandwidth, high latency, spotty connectivity, and other undesirable characteristics.

With a wireless network, the network may be partitioned into subnetworks and reconnected when merged at a later time. With this type of partitioning, maintaining a central controller is not possible. Current techniques to handle partitions exist, in which one partition is considered a primary component that continues to operate while other partitions can no longer be changed or updated until they reconnect with the primary component. Controllers in the other partitions are not changed or updated until they reconnect with the primary component. As a result, a wireless network that changes controllers in non-primary components cannot reconfigure the network devices or switches to reflect the current state of the network and function properly.

Therefore, it would be desirable to have a method and apparatus that takes into account at least some of the issues discussed above, as well as other possible issues. For example, it would be desirable to have a method and apparatus that overcome a technical problem with partitioning of wireless networks that use software defined network architectures.

SUMMARY

An embodiment of the present disclosure provides for a software defined wireless network. The software defined wireless network comprises a plurality of wireless devices and a plurality of controllers. The plurality of wireless devices is configured to be separated into functioning partitions in the software defined wireless network. The plurality of controllers is located on the plurality of wireless devices. Controllers in the plurality of controllers in a functioning partition in the functioning partitions are configured to perform operations in the functioning partition with data synchronized using message sequencing information in the functioning partition.

Another embodiment of the present disclosure provides a method for managing a software defined wireless network. The method comprises exchanging, by a controller on a wireless device, messages with controllers on devices in the software defined wireless network. The method performs operations in a functioning partition with data synchronized using message sequencing information in the functioning partition. The wireless device and the devices form a plurality of wireless devices, and wherein the plurality of wireless devices is configured to be separated into functioning partitions in the software defined wireless network.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it would be desirable to have a method and apparatus that handles partitioning of a software defined wireless network in a manner that allows for different partitions to continue to operate.

The illustrative embodiments provide a method and apparatus that allows controllers to continue to function in all of the partitions and synchronize with the controllers within their partitions independent of the controllers in other partitions. In one illustrative example, a software defined wireless network comprises a plurality of wireless devices and a plurality of controllers. The plurality of wireless devices is configured to be separated into functioning partitions in the software defined wireless network. Controllers in the plurality of controllers in a functioning partition in the functioning partitions are configured to perform operations in the functioning partition with data synchronized using message sequencing information in the functioning partition.

Figure 1:
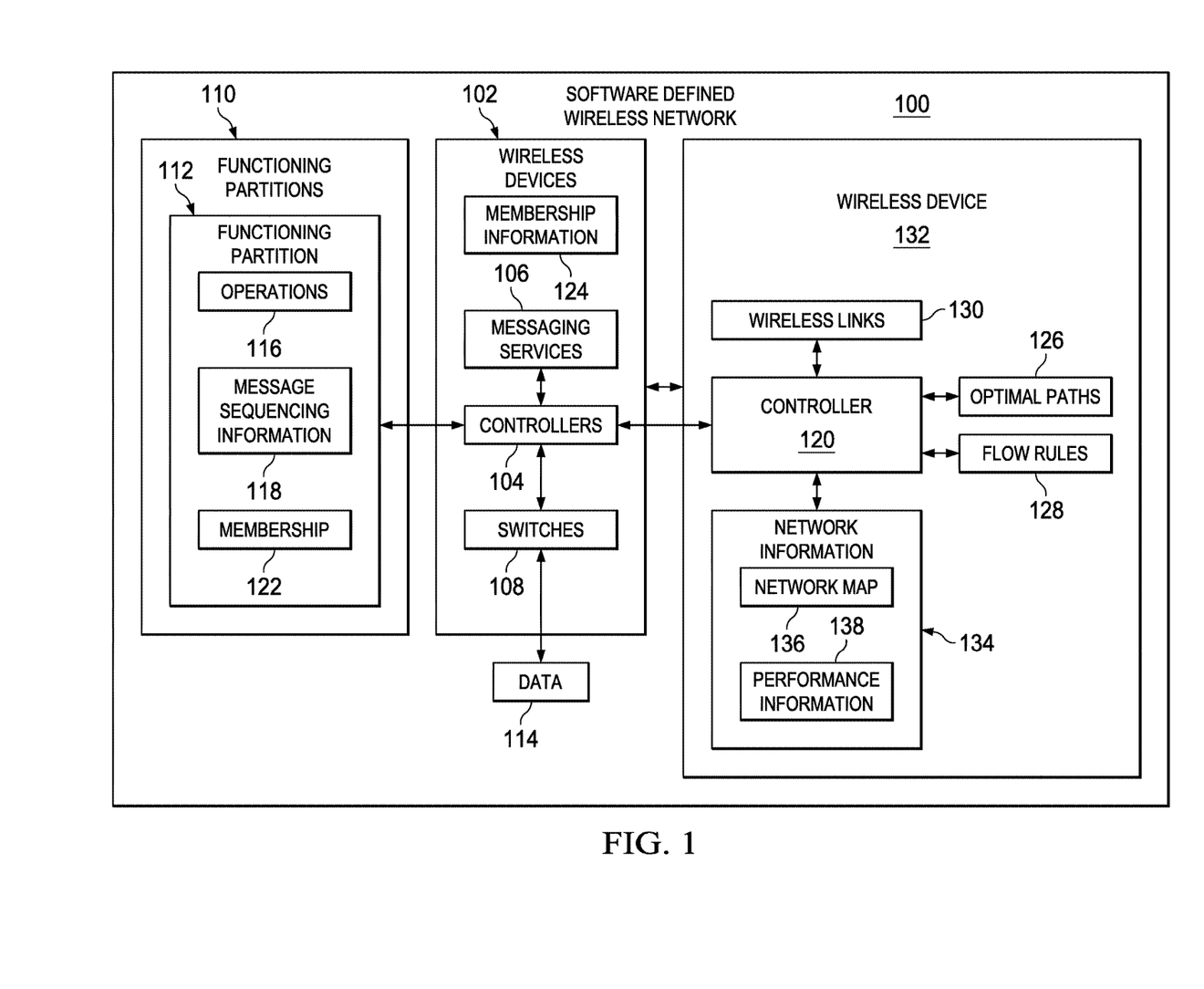
FIG. 1 is an illustration of a block diagram of a software defined wireless network in accordance with an illustrative embodiment.

With reference now to the figures, and in particular, with reference to FIG. 1, an illustration of a block diagram of a software defined wireless network is depicted in accordance with an illustrative embodiment. In this illustrative example, software defined wireless network 100 is a software defined network that comprises wireless devices 102.

As depicted, wireless devices 102 are hardware devices that process data and communicate using wireless communications links. Wireless devices 102 are selected from at least one of a computer, a mobile phone, a tablet computer, an electronic flight bag, a vehicle computer, an engine control unit, or some other suitable type of data processing system that may communicate using wireless communications links.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C; or item B and item C. Of course, any combinations of these items may be present. In some illustrative examples, "at least one of" may be, for example, without limitation, two of item A, one of item B, and ten of item C; four of item B and seven of item C; or other suitable combinations.

As depicted, wireless devices 102 include controllers 104 and messaging services 106. Wireless devices 102 also may include switches 108.

In this depicted example, a plurality of wireless devices 102 are present in which the plurality of wireless devices 102 is configured to be separated into functioning partitions 110 in software defined wireless network 100. Functioning partition 112 in functioning partitions 110 is a partition in which wireless devices 102 and functioning partition 112 operate to synchronously process data 114.

In some illustrative examples, functioning partition 112 may be a single partition that may be present in software defined wireless network 100. In other words, all of wireless devices 102 remain in software defined wireless network 100 without any of wireless devices 102 leaving software defined wireless network 100 to form another functioning partition.

A plurality of controllers 104 on the plurality of wireless devices 102 in functioning partition 112 in functioning partitions 110 is configured to perform operations 116 in functioning partition 112 with data 114 synchronized using message sequencing information 118 in functioning partition 112. In this illustrative example, message sequencing information 118 comprises at least one of a Lamport time stamp or a sequence number. A sequence number is a monotonically increasing number that is incremented by 1 over the sequence number of the last message being sent. A Lamport timestamp is a monotonically increasing number that is incremented by 1 over the Lamport timestamp of the last message being sent or received.

In the illustrative example, operations 116 may take a number different forms. For example, operations 116 may be selected from at least one of routing data 114, forming calculations, storing data 114, encrypting data 114, decrypting data 114, and other suitable types of operations 116. Data 114 may take a number of different forms. For example, data 114 may be selected from at least one of a voice communication, an image, a message, a document, a program, or other suitable types of data.

Further, a plurality of messaging services 106 on the plurality of wireless devices 102 in functioning partition 112 is configured to synchronize data 114 using operations 116 such that all of controllers 104 in functioning partition 112 receive the same data to perform operations 116. In the illustrative example, the plurality of messaging services 106 delivers data 114 that has been received by all of controllers 104 in functioning partition 112. The receipt of data 114 also includes receipt of data 114 by controller 120 sending data 114. Data 114 sent by controller 120 is also received by controller 120.

In these illustrative examples, the plurality of messaging services 106 synchronize data 114 for use by controllers 104 and other components in wireless devices 102. The plurality of messaging services 106 perform this in a manner that is transparent to the plurality of controllers 104. The plurality of messaging services 106 ensures that all of controllers 104 in functioning partition 112 receive the same data in the same order for use in performing operations 116.

As a result, the plurality of controllers 104 do not have to make any determinations as to whether data 114 received by the plurality of controllers 104 is usable. Instead, the plurality of controllers 104 uses data 114 under the assumption that data 114 has been received by all of the plurality of controllers 104.

In this illustrative example, controller 120 in the plurality of controllers 104 monitors for a change in software defined wireless network 100. The change in software defined wireless network 100 may be a change in the composition of wireless devices 102. For example, wireless devices 102 may be partitioned into functioning partitions 110 rather than operating as a single network.

Controller 120 identifies membership 122 for functioning partition 112 and exchanges data 114 with other controllers in membership 122 in functioning partition 112. As depicted, controller 120 identifies membership 122 for functioning partition 112 when at least one of a join message, a leave message, or other message indicating a change in the composition of functioning partition 112 is received by controller 120.

In identifying membership 122 for functioning partition 112, controller 120 identifies a group of controllers 104 seen by controller 120 using membership information 124 from a group of controllers 104 on a group of wireless devices 102. Further, controller 120 proposes membership 122 for functioning partition 112 when controller 120 is a lead controller in functioning partition 112. Controller 120 may be identified as a lead controller in a number different ways. For example, controller 120 may be the first controller to identify membership 122 through a tentative agreement once that node obtains the same membership from the other controllers.

In this illustrative example, controller 120 may identify optimal paths 126 for routing data 114 and creates flow rules 128 from optimal paths 126. Optimal paths 126 are paths using wireless links 130 that are connected to controller 120 on wireless device 132. Controller 120 may implement flow rules 128 in a group of switches 108 on wireless devices 102 in functioning partition 112.

Also, controller 120 may maintain network information 134 comprising network map 136 and performance information 138 for wireless links 130 in network map 136. Performance information 138 may include at least one of a bandwidth, packets per second, a latency, a maximum frame rate, a maximum throughput, connections per second, maximum concurrent connections, and other types of performance information that may be used to select optimal paths 126 or perform other operations.

Components such as controllers 104, messaging services 106 and switches 108 in software defined wireless network 100 may be implemented in software, hardware, firmware, or a combination thereof. When software is used, the operations performed by messaging services 106 and switches 108 may be implemented in program code configured to run on hardware, such as a processor unit. When firmware is used, the operations performed by at least one of controllers 104, messaging services 106, or switches 108 may be implemented in program code and data, and stored in persistent memory to run on a processor unit. When hardware is employed, the hardware may include circuits that operate to perform the operations in at least one of controllers 104, messaging services 106, or switches 108.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In one illustrative example, one or more technical solutions are present that overcome a technical problem with partitioning of wireless networks that use software defined network architectures. For example, a technical problem is present in which only one partition, the primary component, continues to operate while other partitions do not operate unless reconnected with the primary component. As a result, one or more technical solutions may provide a technical effect of enabling all of the partitions to function. These functioning partitions operate using the same data that is synchronized within each of the functioning partitions for all of the controllers within the functioning partitions. In other words, one or more illustrative examples provide a technical effect in which each of the functioning partitions may operate independently.

As a result, wireless devices 102 in software defined wireless network 100 operate as a special purpose computer system. A computer system is one or more data processing systems, such as wireless devices 102 in software defined wireless network 100. At least one of controllers 104 or messaging services 106 enables all of functioning partitions 110 to operate independently when functioning partitions 110 are created from partitioning software defined wireless network 100. In particular, at least one of controllers 104 or messaging services 106 transforms wireless devices 102 in software defined wireless network 100 into a special purpose computer system as compared to currently available general computer systems that do not have at least one of controllers 104 or messaging services 106.

The illustration of software defined wireless network 100 in FIG. 1 is not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, some of wireless devices 102 may not include one or more of controllers 104, messaging services 106, or switches 108. As another illustrative example, software defined wireless network 100 also may include devices with wired connections, in addition to or in place of wireless connections. Software defined wireless network 100 may be implemented to perform a number of different functions, such as monitoring agricultural crops, monitoring factory equipment and devices, performing tactical operations on a battlefield, or other suitable functions.

Figure 2:
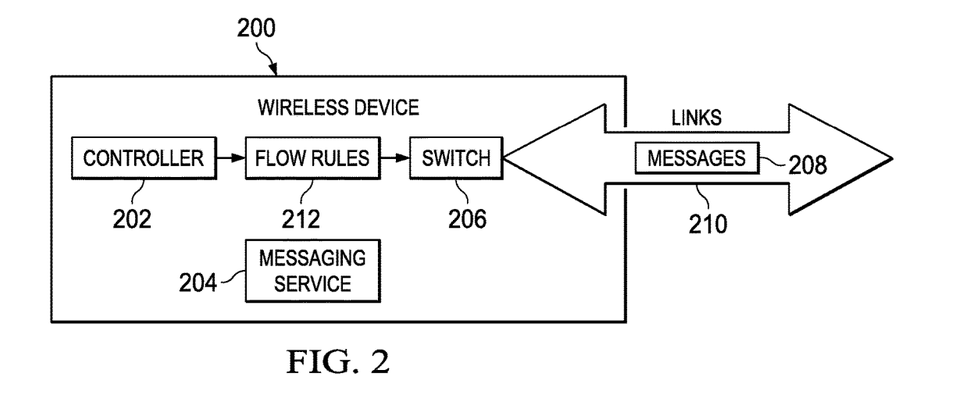
FIG. 2 is an illustration of a block diagram of a wireless device in accordance with an illustrative embodiment.

With reference next to FIG. 2, an illustration of a block diagram of a wireless device is depicted in accordance with an illustrative embodiment. In this depicted example, wireless device 200 is an example of a wireless device in wireless devices 102 in FIG. 1. As depicted, wireless device 200 includes controller 202, messaging service 204, and switch 206.

Controller 202 is a software component in wireless device 200 configured to manage the flow of data between wireless devices 102 and software defined wireless network 100 in FIG. 1. Controller 202 may be analogous to an operating system for software defined wireless network 100 in FIG. 1.

As depicted, messaging service 204 is a software component in wireless device 200 configured to manage messages 208 that may be sent or received at wireless device 200. Messaging service 204 may perform functions such as, for example, casual delivery, agreed delivery, and safe delivery. In this illustrative example, messaging service 204 delivers messages 208 to controller 202 in the correct order after confirming that all of messages 208 have been delivered to other controllers in software defined wireless network 100 in FIG. 1.

In this illustrative example, messaging service 204 may be implemented using extended virtual synchrony (EVS) for nodes, such as wireless devices. As depicted, extended virtual synchrony is a group of communication transport services for multicast and broadcast communication in a distributed system. This type of service maintains a consistent relationship between the delivery of messages and the delivery of configuration changes across processes, such as controllers in a software defined network, such as software defined wireless network 100 in FIG. 1.

When extended virtual synchrony is used to implement the messaging services, primitives are used in messages delivered to the controllers. These primitives include agreed membership, join, leave, message send, and agreed message delivery.

Agreed membership is a list of nodes that are currently connected and that is guaranteed to be the same at all nodes that are in the membership. If a node receives an agreed membership set containing a list of nodes from the extended virtual synchrony service, then the node can guarantee that all nodes in that list identified in the agreed membership set received exactly the same list from their own extended virtual synchrony service. The nodes are connected or are considered to have a link when the nodes can send and receive messages between each other, such that messages sent by one node will be received by other nodes with some probability higher than zero within a defined time interval. The agreed membership is provided as a notification by the local extended virtual synchrony service to a node when the agreed membership set changes. Between two such consecutive notifications, the node may assume that the agreed membership set is stable.

A join is an agreed membership set that contains a node that was not present in the prior membership set. A leave is an agreed membership set that does not contain a node that existed in the prior membership set.

Message send is the ability of a node to send a message to all other nodes in the agreed membership set. The node provides the message to be sent to the local extended virtual synchrony service in order to be sent out. All messages exchanged between the nodes are handled by the extended virtual synchrony service.

Agreed message delivery is the ability of a node to receive messages sent by itself or by other nodes. If a node receives an agreed message from a sender node, then the node is guaranteed that all other messages sent by that sender prior to that message have been already delivered. The sender node may be the node receiving the agreed message or another node. That is, all agreed messages are delivered in the exact sender order they were sent.

If a node receives two agreed messages sent by two different senders in the agreed membership set (say, message q from sender A is received prior to message p from sender B), then all other nodes in the agreed membership set are guaranteed to receive these two messages in the exact same casual order to guarantee causality. That is, all messages are delivered in the exact same global order at all nodes.

If a node sends an agreed message through the extended virtual synchrony service, it is guaranteed that either: (A) the message will be delivered by the EVS service following properties (1) and (2) to all nodes in the agreed membership set (including itself); or (B) all nodes in the agreed membership set will receive an agreed membership notification defined as above, or both (A) and (B) will happen. That is, in a stable agreed membership all messages being sent will be delivered in the same global order.

A node cannot receive an agreed message that has not been sent by a node in either the current or a prior agreed membership set of the receiver. That is, trivial solutions that deliver all nodes a pre-determined set of messages that satisfy properties (1) through (3), for example feeding all nodes the same, pre-determined file, do not apply.

Switch 206 is a software component that is configured to perform switching of messages 208. Switch 206 may forward messages received at wireless device 200 to other wireless devices or nodes through links 210. In this illustrative example, switch 206 forwards messages 208 using flow rules 212. Flow rules 212 are generated by controller 202 in performing flow control.

Figure 3:
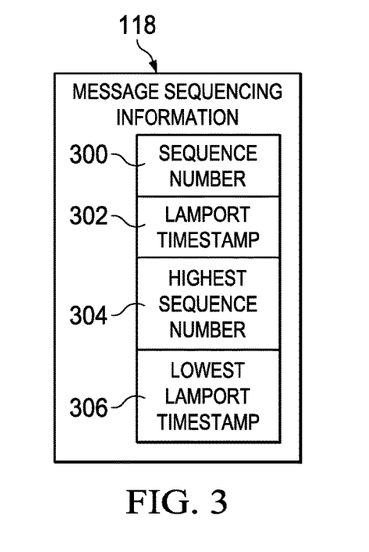
FIG. 3 is an illustration of a block diagram of message sequencing information in accordance with an illustrative embodiment.

With reference now to FIG. 3, an illustration of a block diagram of message sequencing information is depicted in accordance with an illustrative embodiment. In this depicted example, message sequencing information 118 includes sequence number (Seq) 300, Lamport timestamp (LTS) 302, highest sequence number (ARU) 304, and lowest Lamport timestamp (LLTS) 306.

Sequence number 300 is a sequence number that the sender of the message increases for each message. Lamport timestamp 302 is a monotonically increasing number that is incremented by 1 over the Lamport timestamp of the last message being sent or received.

Lamport timestamp 302 may act as a global acknowledgment. In the illustrative example, an ordered message is delivered after all previous ordered messages from the same sender have been delivered. An ordered message has no relationship to messages sent by others.

Highest sequence number 304 is the high sequence number of the message received in order from a particular node. Lowest Lamport timestamp 306 is the lowest Lamport timestamp included in any peer's latest in ordered message. The latest in ordered message is the message from a sender having the highest sequence number. The sequence number is set by the sender.

These fields are used by a messaging service to place incoming messages sent to a wireless device in a desired order for delivery to a component in the wireless device, such as a controller. In this manner, components in the wireless device may process messages without having to determine whether those messages are in the correct order or whether they have been received by all other controllers in the functioning partition of a software defined wireless network.

Figure 4:
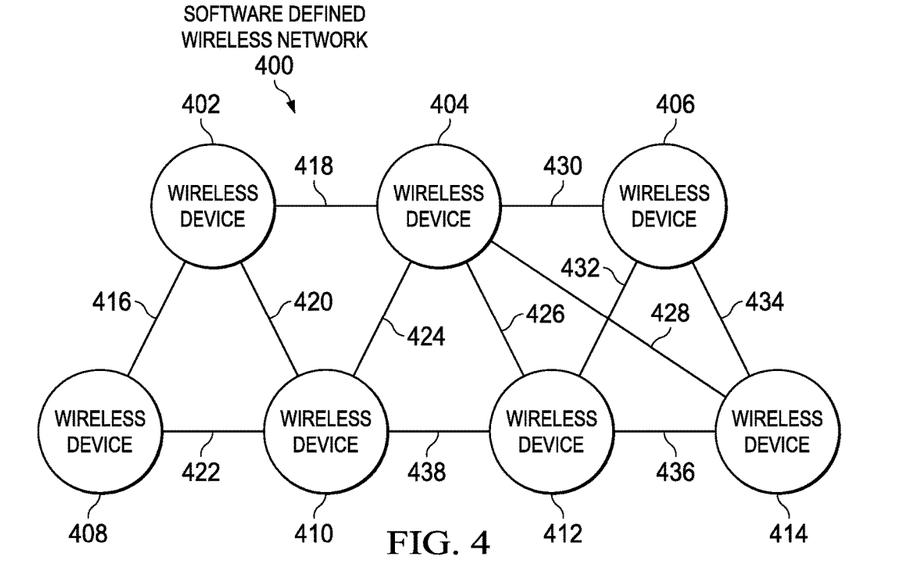
FIG. 4 is an illustration of a software defined wireless network in accordance with an illustrative embodiment.

With reference now to FIG. 4, an illustration of a software defined wireless network is depicted in accordance with an illustrative embodiment. In this illustrative example, software defined wireless network 400 is an example of one implementation for software defined wireless network 100 in FIG. 1. In this illustrative example, software defined wireless network 400 includes wireless device 402, wireless device 404, wireless device 406, wireless device 408, wireless device 410, wireless device 412, and wireless device 414. Each of these wireless devices may be implemented using a wireless device, such as wireless device 200 in FIG. 2.

These different wireless devices communicate with each other using wireless links. As depicted, wireless link 416, wireless links 418, wireless links 420, wireless link 422, wireless link 424, wireless link 426, wireless link 428, wireless link 430, wireless link 432, wireless link 434, wireless links 436, and wireless link 428 are present in software defined wireless network 400.

With each of these wireless devices having a controller, these physically distributed controllers may allow for more flexibility in different types of deployments of software defined wireless network 400. For example, the physical distribution allows for increased performance and flexibility in tactical software defined network deployments using software defined wireless network 400.

Figure 5:
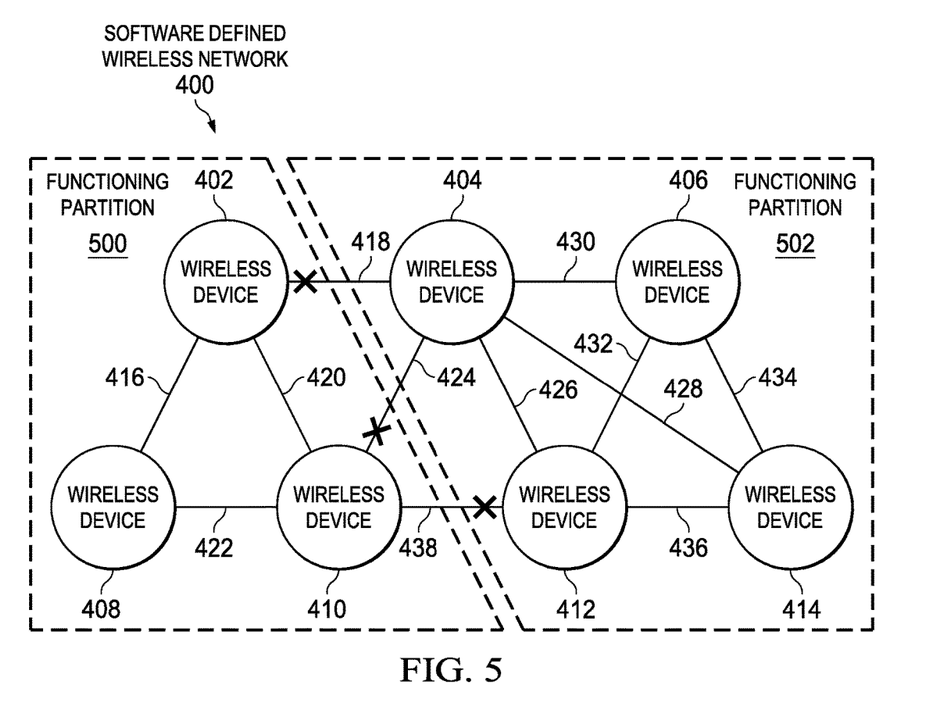
FIG. 5 is an illustration of a partitioned software defined wireless network in accordance with an illustrative embodiment.

With reference now to FIG. 5, an illustration of a partitioned software defined wireless network is depicted in accordance with an illustrative embodiment. As depicted in this figure, wireless link 418 wireless link 424 and wireless link 438 have been lost. A communications link may be considered lost when the link is no longer present or the link no longer able to facilitate the exchange of information in a desired manner. For example, if the packet loss is greater than some threshold, the link is soon to be lost and the controller in the wireless device is removed from the agreed membership.

With the loss of these communications links, software defined wireless network 400 now has functioning partition 500 and functioning partition 502. Functioning partition 500 includes wireless device 402, wireless device 408, and wireless device 410. Functioning partition 502 includes wireless device 404, wireless device 406, wireless device 412, and wireless device 414.

In the illustrative example, these functioning partitions both operate independently of each other. The wireless devices in each of the functioning partitions continue to synchronize data and operate using the same data within a partition.

Figure 6:
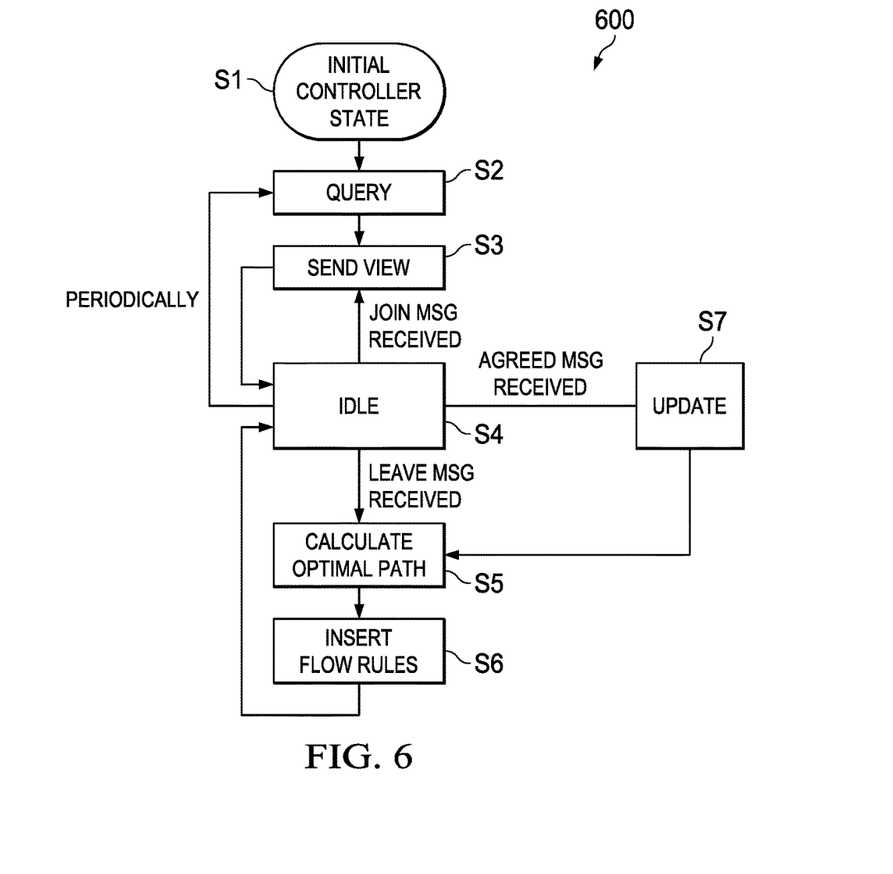
FIG. 6 is an illustration of a state machine for a controller in accordance with an illustrative embodiment.

With reference now to FIG. 6, an illustration of a state machine for a controller is depicted in accordance with an illustrative embodiment. In this illustrative example, state machine 600 is an example of a state machine that may be implemented in a controller, such as controller 202 in FIG. 2, or in any of controllers 104 in FIG. 1.

As depicted, state machine 600 operates using events received from a messaging service. In this illustrative example, events are join, leave, and agreed. A join event indicates when a node joins the network. A leave event indicates when a node leaves the network or is no longer communicating. An agreed event indicates the receipt of an agreed message from another controller on another wireless device. These different events are identified from messages received by controllers from the messaging service.

As depicted, state machine 600 begins in initial controller state S1. State machine 600 shifts into query state S2 in which a query is made to obtain a view of the software defined wireless network in which the controller is located. The view is a list of controllers on the wireless devices.

State machine 600 shifts into send view state S3 in which state machine 600 sends the view that the controller has of the network to all other controllers that are considered to be present in the network. The process then shifts into idle state S4.

When events are not received, state machine 600 periodically shift into query state S2. This shift into query state S2 may occur upon the expiration of time.

From idle state S4, state machine 600 shifts to send view state S3 when a join message is received. When a leave message is received, state machine 600 shifts to calculate optimal path state S5. In calculate optimal path state S5, state machine 600 identifies optimal paths for sending messages to different destinations.

Based on identifying one or more optimal paths, state machine 600 also generates flow rules that may be used by a local switch to direct messages to different links connected to the wireless device in which the switch is located. The local switch is the switch in the same wireless device as the controller running state machine 600.

State machine 600 then shifts to insert flow rules state S6. In this state, state machine 600 inserts flow rules generated from the optimal paths into the local switch. State machine 600 then shifts back to idle state S4.

Further, in idle state S4, state machine 600 may shift to update state S7 when an agreed message has been received. In update state S7, state machine 600 updates the current network view. This current network view identifies a membership of other controllers present in the functioning partition. In the illustrative example, the membership is for wireless devices and not merely controllers. For example, the membership may include other wireless devices without controllers. For example, the controllers may manage multiple devices. Those other devices may also be part of the membership in addition to wireless devices with controllers. A wireless device as a device that can lose connectivity to other devices. From update status S7, state machine 600 also shifts into calculate optimal path state S5, as described above.

Figure 7:
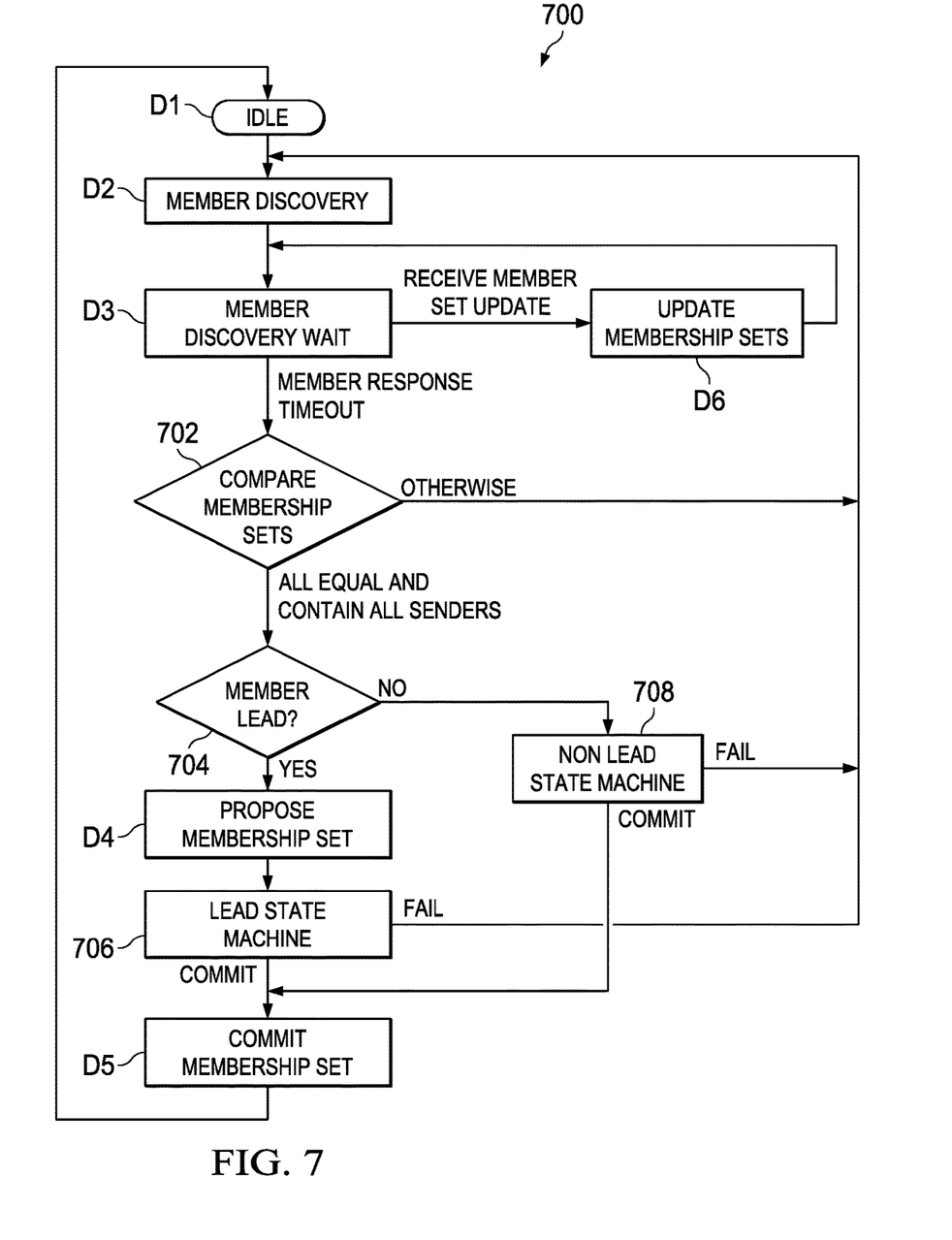
FIG. 7 is an illustration of a membership discovery state machine in accordance with an illustrative embodiment.

With reference now to FIG. 7, an illustration of a membership discovery state machine is depicted in accordance with an illustrative embodiment. In this illustrative example, membership discovery state machine 700 is an example of a state machine that may be implemented in a service, such as messaging service 204 in FIG. 2, or in any of messaging services 106 in FIG. 1.

In this illustrative example, the membership discovery state machine 700 begins in idle state D1. Membership discovery state machine 700 then shifts into member discovery state D2. In this state, membership discovery state machine 700 sends a request in a broadcast message to identify other messaging services in the network.

Membership discovery state machine 700 then shifts into member discovery wait state D3. In this state, membership discovery state machine 700 waits to receive responses.

If a timeout occurs while waiting for responses from members in the network, a comparison is made from responses received to the membership that is currently identified for the network (operation 702). If the responses equal the membership currently identified, membership discovery state machine 700 shifts back to membership discovery state D2.

Otherwise if the responses are not the same as the membership currently identified, membership discovery state machine 700 determines whether the messaging service is a lead member (operation 704). If the controller is a lead member, membership discovery state machine 700, shifts to propose membership set state D4. In this state, membership discovery state machine 700 generates a unique set identifier and broadcasts the unique set identifier onto the network. Membership discovery state machine 700 then initiates lead state machine 706.

If a fail results from lead state machine 706, membership discovery state machine 700 shifts to membership discovery state D2. If the result returned by lead state machine 706 is commit, membership discovery state machine 700 shifts to commit membership set state D5 with membership discovery state machine 700 then returning to idle state D1

In operation 704, if the messaging service is not a member, membership discovery state machine 700 initiates non-lead state machine 708. If the result of this state machine is a fail, membership discovery state machine 700 shifts to member discovery state D2. If the result of non-lead state machine 708 is commit, membership discovery state machine 700 shifts to commit membership set state D5.

In member discovery wait state D3, membership discovery state machine 700 shifts to update membership sets state D6 if a receive member set update is received. In this state, membership discovery state machine 700 will add a sender sending the update to the current membership and set the membership set update from the sender.

Figure 8:
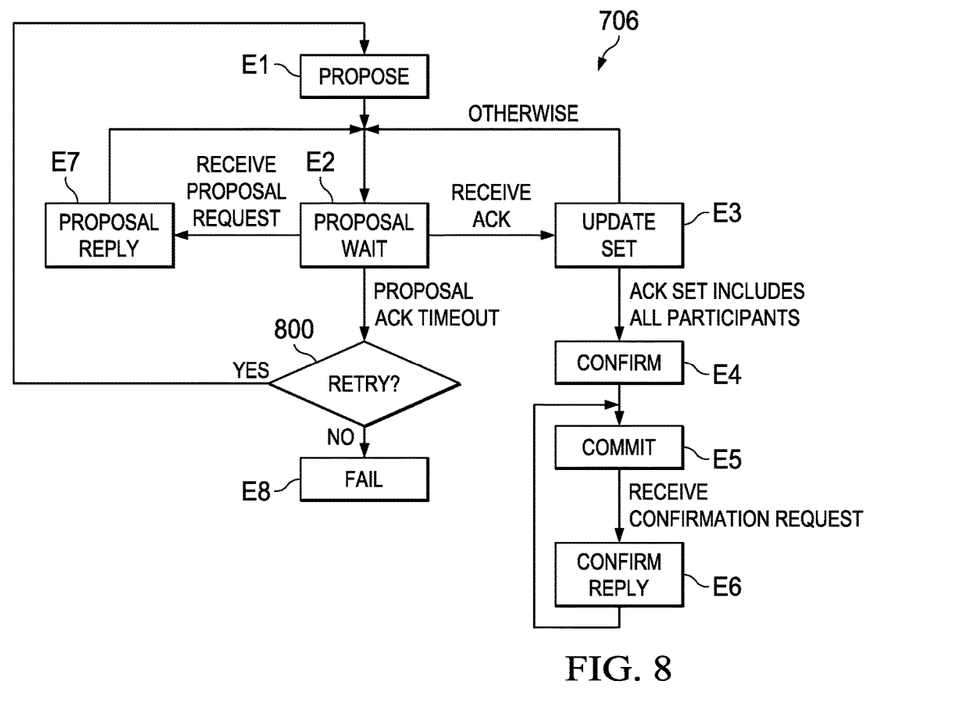
FIG. 8 is an illustration of a lead state machine in accordance with an illustrative embodiment.

With reference now to FIG. 8, an illustration of a lead state machine is depicted in accordance with an illustrative embodiment. In this illustrative example, an example of an implementation for lead state machine 706 in FIG. 7 is shown. As depicted, lead state machine 706 is an example of a state machine that may be implemented in a messaging service, such as messaging service 204 in FIG. 2 or in any of messaging services 106 in FIG. 1.

In this example, lead state machine 706 begins by receiving a proposed membership set in propose state E1. The proposed membership set is generated by membership discovery state machine 700 in propose membership set state D4 in FIG. 7. In this state, lead state machine 706 sends a proposal for the membership set as a broadcast onto the network. Thereafter, lead state machine 706 shifts to proposal wait state E2. In this state, lead state machine 706 waits for a response to the proposed membership broadcast onto the network.

If an acknowledgment is received, lead state machine 706 shifts to update set state E3. In this example, the acknowledgment includes an acknowledgment set identifying a membership for the network. In this state, if the membership in the acknowledgment set matches the current proposal for the membership, the sender is added to the acknowledgment set.

If the acknowledgment set includes all of the participants, lead state machine 706 shifts to confirm state E4. The participants are all of the wireless devices in the network.

Thereafter, lead state machine 706 shifts to commit state E5 to generate a commit for lead state machine 706. In commit state E5, lead state machine 706 saves the membership information. The membership is now agreed by all of the messaging services in the functioning partition. When a confirmation request is received, lead state machine 706 shifts to confirm reply state E6. This reply sends a confirmation. The confirmation is sent unicast to the lead messaging service. Lead state machine 706 then returns to commit state E5.

Lead state machine 706 shifts from update set state E3 back to proposal wait state E2 if the acknowledgment set does not include all of the participants.

With reference again to proposal wait state E2, if a proposal request is received, lead state machine 706 shifts to proposal reply state E7. In this state, if the request is from a participant, a reply is made by sending a proposal. In this illustrative example, the participant is a node such as a wireless device that is already in the list that is maintained by lead state machine 706. Lead state machine 706 then returns to proposal wait state E2.

In this example, the proposed lead is a messaging service running lead state machine 706, which has sent out a proposal saying that it thinks that it has the correct list of nodes and that lead state machine 706 has the lowest identifier in the list, making that messaging service the lead state machine 706, and proposes that the other messaging services accept the messaging service running as lead state machine 706 as the lead. While waiting for the acceptance, the messaging service running lead state machine 706 gets a proposal from some other messaging service that wants to be lead. If the messaging service sending the proposal is in the list of messaging services running lead state machine 706, the messaging service running lead state machine 706 replies by repeating the proposal just to that messaging service. Only one of these two messaging services should have the lowest identifier, and if that messaging service is already in the list, then there is nothing to do other than repeat the proposal to the messaging service that just sent the proposal request and wait for the response.

If a timeout occurs in proposal wait state E2, a determination is made as to whether to retry sending the proposal for the membership in the network (operation 800). If a retry should occur, lead state machine 706 shifts back to proposal state E1. If a retry is not to occur, lead state machine 706 shifts to fail state E8 to generate a fail for lead state machine 706.

Figure 9:
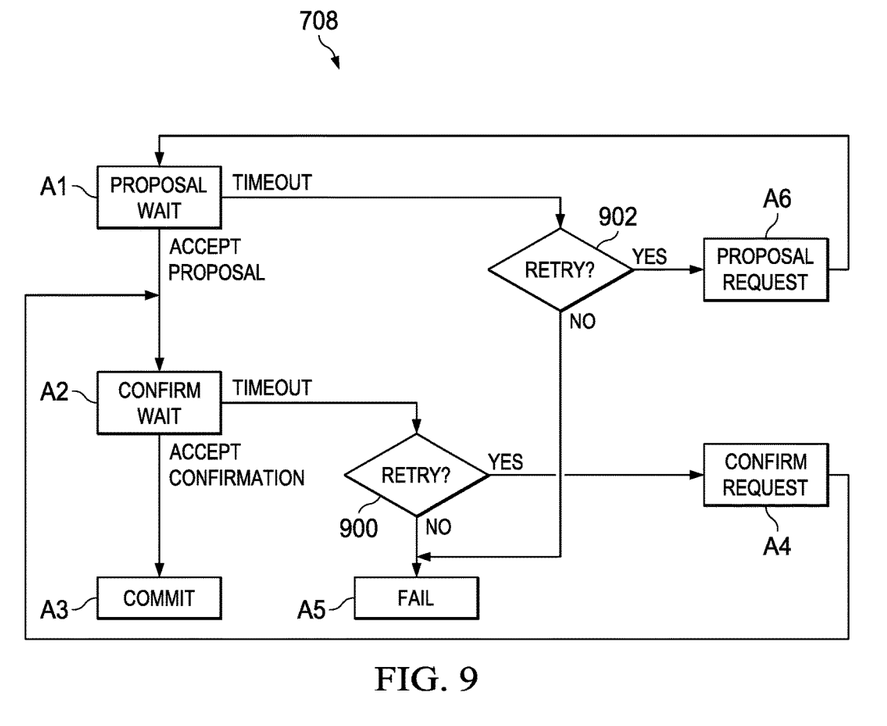
FIG. 9 is an illustration of a non-lead state machine in accordance with an illustrative embodiment.

With reference now to FIG. 9, an illustration of a non-lead state machine is depicted in accordance with an illustrative embodiment. In this illustrative example, an example of an implementation for non-lead state machine 708 in FIG. 7 is shown. As depicted, membership discovery state machine 700 is an example of a state machine that may be implemented in a messaging service such as messaging service 204 in FIG. 2, or in any of messaging services 106 in FIG. 1.

As depicted, non-lead state machine 708 begins in proposal wait state A1. Non-lead state machine 708 shifts to confirm wait state A2 when an accept proposal message is received. This message is received from the proposed lead, which is the messaging service running lead state machine 706. In confirm wait state A2, non-lead state machine 708 shifts to commit state A3 if an accept confirmation message is received. In this state, a commit message is generated by non-lead state machine 708. The state machine then terminates.

In confirm wait state A2, a determination as to whether to retry if a timeout occurs (operation 900). If a retry is to occur, non-lead state machine 708 shifts to confirm request state A4. In this state, non-lead state machine 708 sends a confirm request to the lead state machine. Non-lead state machine 708 then shifts back to confirm wait state A2.

With reference again to operation 900, if a retry does not occur, non-lead state machine 708 shifts to fail state A5. In fail state A5, non-lead state machine 708 generates a fail and terminates.

In proposal wait state A1, if a timeout occurs, a determination is made as to whether a retry should occur (operation 902). If a retry should occur, non-lead state machine 708 shifts to proposal request state A6. In this state, a proposal request is sent to the lead state machine. Non-lead state machine 708 then shifts back to proposal wait state A1. If a retry does not occur in operation 902, non-lead state machine 708 shifts to fail state A5 as described above.

Figure 10:
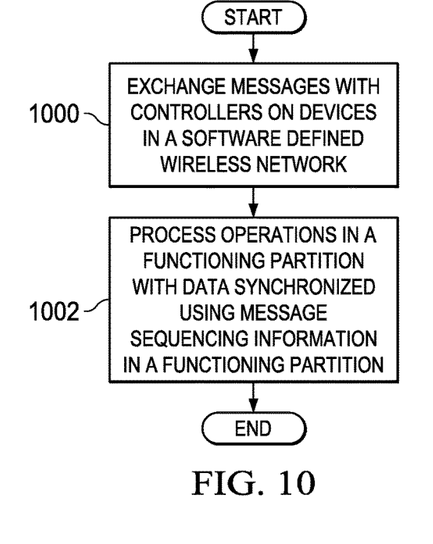
FIG. 10 is an illustration of a flowchart of a process for managing a software defined wireless network in accordance with an illustrative embodiment.

Turning next to FIG. 10, a flowchart of a process for managing a software defined wireless network is depicted in accordance with an illustrative embodiment. The process illustrated in FIG. 10 may be implemented using at least one of program code or hardware. When program code is used, the program code may be run on a processor unit in a data processing system, such as one of wireless devices 102 in FIG. 1. The program code may be used to implement a component, such as controller 120 in FIG. 1.

The process begins by exchanging messages with controllers on devices in a software defined wireless network (operation 1000). In operation 1000, messages are received by controllers from a messaging service.

The process then processes operations in a functioning partition with data synchronized using message sequencing information in a functioning partition (operation 1002). The process terminates thereafter. The wireless device and the wireless devices form a plurality of wireless devices in which the plurality of wireless devices are configured to be separated into functioning partitions in the software defined wireless network. In operation 1002, data is synchronized by a plurality of messaging services on the plurality of wireless devices using the message sequencing information, such that all of the controllers receive the same data to perform the operations.

Figure 11:
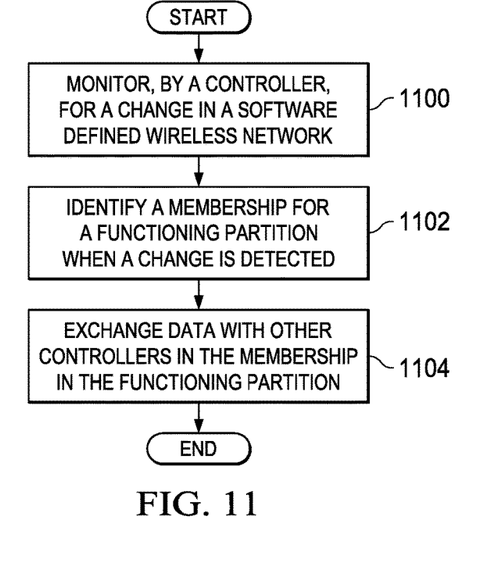
FIG. 11 is an illustration of a flowchart of a process for changing a membership in a software defined wireless network in accordance with an illustrative embodiment.

Turning to FIG. 11, a flowchart of a process for changing a membership in a software defined wireless network is depicted in accordance with an illustrative embodiment. The process illustrated in FIG. 11 may be implemented using at least one of program code or hardware. When program code is used, the program code may be run on a processor unit in a data processing system, such as one of wireless devices 102 in FIG. 1. The program code may be used to implement a component, such as controller 120 in FIG. 1.

The process begins by monitoring, by a controller, for a change in a software defined wireless network (operation 1100). The process identifies a membership for a functioning partition when a change is detected (operation 1102). In operation 1102, the membership for the functioning partition is identified when at least one of a join message or a leave message is received by the controller.

The process exchanges data with other controllers in the membership in the functioning partition (operation 1104). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 12:
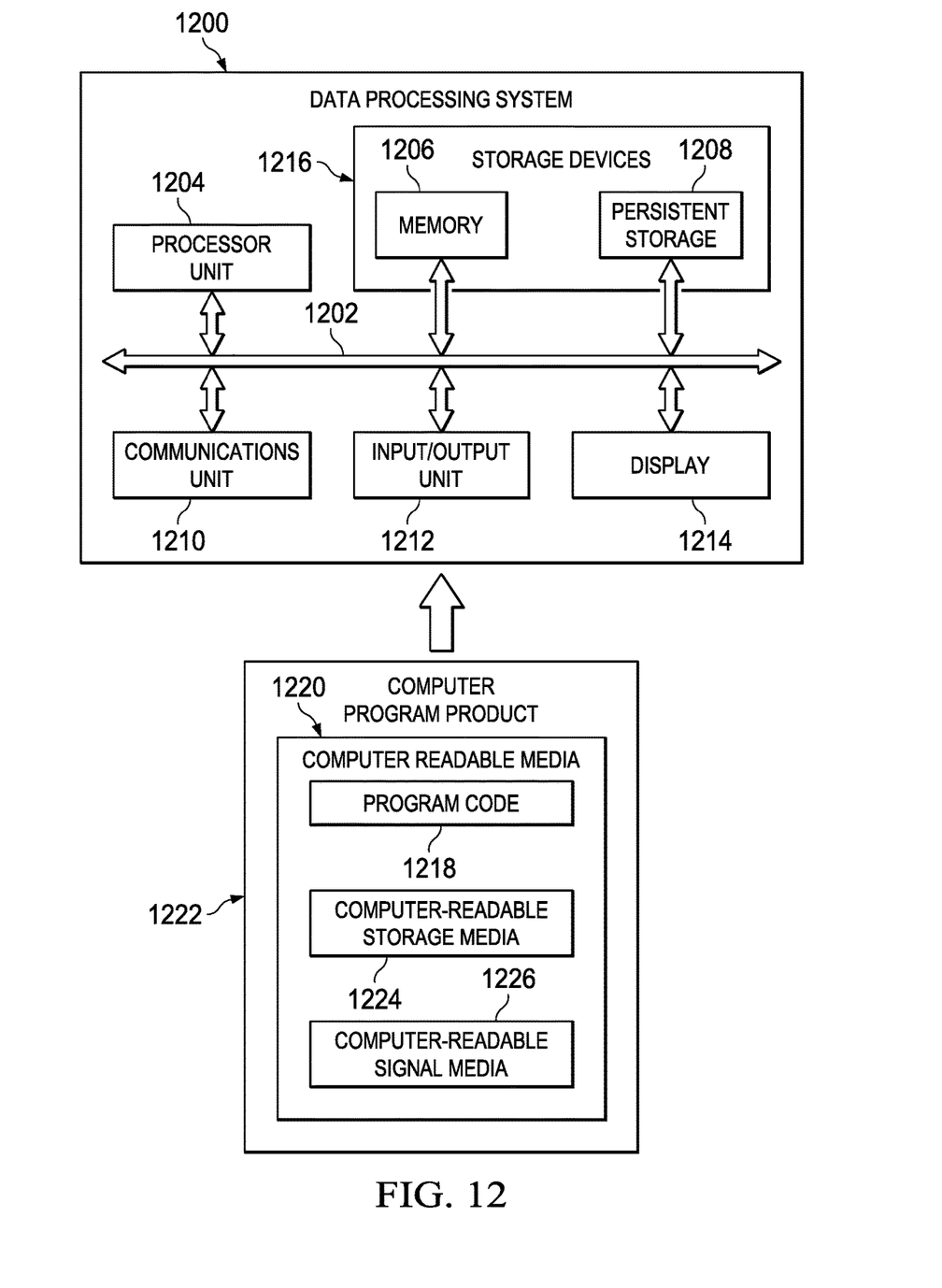
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 may be used to implement wireless devices 102 in FIG. 1, wireless device 132 in FIG. 1, wireless device 200 in FIG. 2, Data processing system 1200 also may be used to implement wireless device 402, wireless device 404, wireless device 406, wireless device 408, wireless device 410, wireless device 412, and wireless device 414 in FIG. 4. In this illustrative example, data processing system 1200 includes communications framework 1202, which provides communications between processor unit 1204, memory 1206, persistent storage 1208, communications unit 1210, input/output unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, may be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a solid state hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer-usable program code, or computer-readable program code that may be read and executed by a processor in processor unit 1204. The program code in the different embodiments may be embodied on different physical or computer-readable storage media, such as memory 1206 or persistent storage 1208.

Program code 1218 is located in a functional form on computer-readable media 1220 that is selectively removable and may be loaded onto or transferred to data processing system 1200 for execution by processor unit 1204. Program code 1218 and computer-readable media 1220 form computer program product 1222 in these illustrative examples. In one example, computer-readable media 1220 may be computer-readable storage media 1224 or computer-readable signal media 1226. In these illustrative examples, computer-readable storage media 1224 is a physical or tangible storage device used to store program code 1218 rather than a medium that propagates or transmits program code 1218.

Alternatively, program code 1218 may be transferred to data processing system 1200 using computer-readable signal media 1226. Computer-readable signal media 1226 may be, for example, a propagated data signal containing program code 1218. For example, computer-readable signal media 1226 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components, in addition to or in place of those illustrated, for data processing system 1200. Other components shown in FIG. 12 can be varied from the illustrative examples shown. The different embodiments may be implemented using any hardware device or system capable of running program code.

Thus, the illustrative examples provide one or more technical solutions that are present that overcome a technical problem with partitioning of wireless networks that use software defined network architectures. One or more technical solutions in the illustrative examples provide a technical effect of enabling all of the partitions to continue to function when split out of a single partition or a software defined wireless network.

These functioning partitions operate using the same data that is synchronized within each of the functioning partitions for all of the controllers within the functioning partitions. In other words, one or more illustrative examples provide a technical effect in which each of the functioning partitions may operate independently.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A software defined wireless network comprising:
a plurality of wireless devices, wherein the plurality of wireless devices is separated into functioning partitions in the software defined wireless network, wherein the wireless devices within the functioning partition in the functioning partitions and the functioning partition in the functioning partitions operate to synchronously process data; and
a plurality of controllers on the plurality of wireless devices, wherein controllers in the plurality of controllers in a functioning partition in the functioning partitions are configured to perform operations in the functioning partition with data synchronized using message sequencing information in the functioning partition such that all of the controllers receive a same data to perform the operations.

2. The software defined wireless network of claim 1 further comprising:
a plurality of messaging services on the plurality of wireless devices, wherein the plurality of messaging services is configured to synchronize the data using the message sequencing information.

3. The software defined wireless network of claim 1, wherein the message sequencing information comprises a Lamport time stamp and a sequence number.

4. The software defined wireless network of claim 1, wherein a controller monitors for a change in the software defined wireless network, identifies a membership for the functioning partition and exchanges data with other controllers in the membership in the functioning partition.

5. The software defined wireless network of claim 1, wherein a controller identifies a membership for the functioning partition when at least one of a join message or a leave message is received by the controller.

6. The software defined wireless network of claim 5, wherein the controller implements flow rules in a group of switches in the functioning partition.

7. The software defined wireless network of claim 5, wherein in identifying a membership for the functioning partition, the controller identifies a group of controllers seen by the controller using membership information from the group of controllers on a group of the wireless devices.

8. The software defined wireless network of claim 1, wherein a controller identifies optimal paths for routing the data and creates flow rules from the optimal paths.

9. The software defined wireless network of claim 1, wherein a controller maintains a network comprising a network map and performance information for links in the network map.

10. The software defined wireless network of claim 1, wherein the plurality of wireless devices is selected from at least one of a computer, a mobile phone, a tablet computer, an electronic flight bag, a vehicle computer, or an engine control unit.

11. A method for managing a software defined wireless network, the method comprising:
exchanging, by a controller on a wireless device, messages with controllers on wireless devices in the software defined wireless network; and
performing operations in a functioning partition with data synchronized using message sequencing information in the functioning partition such that all of the controllers receive a same data to perform the operations, wherein the wireless device and the wireless devices form a plurality of wireless devices, and wherein the plurality of wireless devices is separated into functioning partitions in the software defined wireless network, and wherein the wireless devices within the functioning partition in the functioning partitions and the functioning partition in the functioning partitions operate to synchronously process data.

12. The method of claim 11, wherein the message sequencing information comprises a Lamport time stamp and a sequence number.

13. The method of claim 11 further comprising:
monitoring, by the controller, for a change in the software defined wireless network;
identifying, by the controller, a membership for the functioning partition when the change is detected; and
exchanging, by the controller, the data with other controllers in the membership in the functioning partition.

14. The method of claim 13, wherein the controller identifies the membership for the functioning partition when at least one of a join message or a leave message is received by the controller.

15. The method of claim 13, wherein identifying, by the controller, the membership for the functioning partition comprises:
identifying, by the controller, a group of controllers seen by the controller using membership information from a group of messaging services on the wireless devices.

16. The method of claim 11 further comprising:
identifying, by the controller, optimal paths for routing the data; and
creating, by the controller, flow rules from the optimal paths.

17. The method of claim 16, wherein the controller implements the flow rules in a group of switches in the functioning partition.

18. The method of claim 11 further comprising:
maintaining, by the controller, a network comprising a network map and performance information for links in the network map.

19. The method of claim 11, wherein the plurality of wireless devices is selected from at least one of a computer, a mobile phone, a tablet computer, an electronic flight bag, a vehicle computer, or an engine control unit.

\* \* \* \* \*